US007600922B2

(12) United States Patent
Teramachi

(10) Patent No.: US 7,600,922 B2
(45) Date of Patent: Oct. 13, 2009

(54) BALL ROLLER ROLLING MEMBER

(76) Inventor: Hiroshi Teramachi, 3-12-30-301 Kamiosaki, Shinagawa-ku, Tokyo (JP) 141-0021

( * ) Notice: Subject to any disclaimer, the term of this patent is extended or adjusted under 35 U.S.C. 154(b) by 573 days.

(21) Appl. No.: 11/003,826

(22) Filed: Dec. 3, 2004

(65) Prior Publication Data
US 2005/0238272 A1 Oct. 27, 2005

(30) Foreign Application Priority Data

Dec. 4, 2003 (JP) ............................. 2003-436288
Mar. 25, 2004 (JP) ............................. 2004-126152

(51) Int. Cl.
*F16C 33/32* (2006.01)
*F16C 33/34* (2006.01)
(52) U.S. Cl. ...................... 384/491; 384/568
(58) Field of Classification Search ............ 384/43–45, 384/47, 49, 491, 565–568, 574, 609, 619, 384/447; 29/898.04, 898.052, 899
See application file for complete search history.

(56) References Cited
U.S. PATENT DOCUMENTS 3,713,712 A * 1/1973 Derner et al. ............... 384/565

5,890,815 A * 4/1999 Ijuin et al. .................. 384/568
6,390,685 B1 * 5/2002 Shimomura et al. ......... 384/568

FOREIGN PATENT DOCUMENTS

GB        2207957        *   2/1989

* cited by examiner

*Primary Examiner*—Richard W L Ridley
*Assistant Examiner*—James Pilkington
(74) *Attorney, Agent, or Firm*—Burr & Brown

(57) ABSTRACT

The present invention provides a ball roller rolling member which can take crossing arrangement, conveyance including alignment and separation can be easily automated, lateral both sides of a rolling curved portion can be easily discriminated and the rolling curved portion thereof can be precisely ground. Such ball roller rolling member comprises a rolling curved portion having a circular-arc outer periphery and end spherical portions provided on both sides of the rolling curved portion so as to be spherically swelled outward, respectively, the rolling curved portion having a radius of the circular-arc portion larger than a radius of curvature of each of the end spherical portions. The rolling curved portion has the maximum diameter longer than a distance between the end spherical portions, the ball roller rolling members are arranged between a pair of track grooves having track surfaces perpendicular to each other so that rotational axes of the adjacent ball roller rolling members are alternately perpendicular to each other, and one of the end spherical portions is formed with a spherical recessed portion having a radius of curvature equal to that of the one of the end spherical portions.

1 Claim, 10 Drawing Sheets (A)

(B)

(C)

(D)

(A)

(B)

(A)

(B)

(C)

(A)

(B)

(A)

(B)

(C)

(A)

(B)

(A)

(B)

BALL ROLLER ROLLING MEMBER

CROSS-REFERENCE TO RELATED APPLICATION

This application claims priority under 35 U.S.C. § 119 to Japanese Patent Application Nos. 2003-436288 filed Dec. 4, 2003 and 2004-126152 filed Mar. 25, 2004, the entire contents of which are hereby incorporated herein by reference.

BACKGROUND OF THE INVENTION

The present invention relates to a ball roller rolling member which is utilized as rolling member for a rolling bearing or rolling motion guide device.

The inventor of the subject application had already obtain the U.S. patent (U.S. Pat. No. 6,398,417) relating to a ball roller rolling member which has a combined characteristics of self-aligning property of a ball and high rigidity of a roller.

The term "ball roller" used herein means a member which has a large load (carrying) capacity substantially equivalent to that of the roller as well as easily handling characteristic as a ball, and the ball roller rolling member generally comprises a rolling curved portion and end spherical portions disposed on both sides of the rolling curved portion. The end spherical portions are positioned on one virtual spherical surface, and the rolling curved portion has a sectional circular-arc shape having a radius of curvature larger than that of the end spherical portion.

However, in the ball roller rolling member disclosed in the U.S. Pat. No. 6,398,417, a distance between the end spherical portions is longer than the maximum diameter of the rolling curved portion, so that this ball roller rolling member can not be used for a rotating bearing or linear motion guide having a crossing arrangement in which rotational axes of the rolling members are perpendicular alternately to each other between a pair of track grooves provided with perpendicular track surfaces of the rotting bearing or linear motion guide.

Moreover, both the rolling curved portion and the end spherical portions have the spherical surfaces, and when this ball roller rolling member is freely rolled, it rolls in various direction unevenly as like a ball, and therefore, it is difficult to automatically align the ball roller rolling members by a parts-feeder and to separate defective products.

Furthermore, in a case where the ball roller is precisely ground, by using a lapping machine, the ball roller rolling member is generally put into spiral grooves formed to upper and lower discs from the central portion thereof, and the discs are relatively rotated so as to grind the contact surface thereof while rolling the ball roller rolling member so that the spiral grooves is directed from the central portion towards the outer side portion. At this time, there causes a peripheral speed difference between the outer edge and the inner edge of the spiral groove, and according to such peripheral speed difference, grinding amount on the outer edge portion is made larger than that on the inner edge portion, so that the ball roller rolling member, which has been once ground, is again set to the lapping machine in a state reverse in position to the above state and is then ground to thereby grind it substantially laterally uniformly.

However, since a conventional ball roller rolling member is generally laterally symmetrical, it is difficult to discriminate the lateral portions of the once ground ball roller member, that is, which is the ground lateral one side, i.e., inner circular side of the spiral groove, and it is hence difficult to precisely grind the ball roller rolling member by using the lapping machine.

The inventors also proposed a method of simultaneously grinding rolling surfaces of ball roller rolling members, which are magnetically adsorbed so as to form a row of raw material balls in form of rod, by a center-less grinding as disclosed in Japanese Laid-open Patent Publication No. 2002-178244.

However, in such prior art technology, since the raw material balls contact each other in point-contact state, there was a fear of displacing or shifting the contacting portion at the time of grinding the ball roller rolling member, which may lead to worse working performance to the rolling surfaces of the balls.

SUMMARY OF THE INVENTION

The present invention was conceived in consideration of the above defects or drawbacks encountered in the prior art mentioned above and an object thereof is to provide a ball roller rolling member capable of providing a crossing arrangement, easily automating a conveyance including alignment and separation, easily discriminating lateral portions and grinding the ball roller rolling member with high precision.

The above and other objects can be achieved according to the present invention by providing, in one aspect, a ball roller rolling member comprising:

a rolling curved portion having a circular-arc outer periphery; and end spherical portions provided on both sides of the rolling curved portion so as to be spherically swelled outward, respectively, the rolling curved portion having a radius of the circular-arc portion larger than a radius of curvature of each of the end spherical portions, wherein a maximum diameter of the rolling curved portion is made longer than a distance between the end spherical portions and the ball roller rolling members are arranged between a pair of track grooves having track surfaces perpendicular to each other so that rotational axes of the adjacent ball roller rolling members are alternately perpendicular to each other, and one of the end spherical portions is formed with a spherical recessed portion having a radius of curvature equal to that of the end spherical portion.

In another aspect of the present invention, there is also provided a method of manufacturing ball roller rolling members arranged in a row in form of rod, comprising the steps of:

preparing a plurality of metal balls as works which are not hardened;

compressing and practically deforming the works so as to provide a spherical recessed portion to one end portion of each work with respect a center of the metal ball as a work;

arranging the works in a row in form of rod so that another end portion of one work in the row, with respect to the center of the work, other than the one end to which the spherical recessed portion is formed, is fitted to the spherical recessed portion of another one work which is adjacent to the one work mentioned above, the works in a row having a virtual axis linearly penetrating the centers of the respective works in a row;

grinding the respective works simultaneously so as to provide ball roller rolling members in a row each having a rolling curved portion having a predetermined dimension and shape.

In this aspect, it is preferred that the works in form of rod are magnetically adsorbed.

It is to be noted that, in a preferred embodiment of the above aspect of the present invention, the arrangement of the ball roller rolling members between the track grooves is not limited to the above embodiment and includes a parallel arrangement of the rotational axes of the ball roller rolling members.

Furthermore, since the maximum diameter of the rolling curved portion is made longer than a distance between the end spherical portions, so that it is possible to arrange the ball roller rolling members between a pair of track grooves, and accordingly, the ball roller rolling members arranged in a row can support and bear loads in every direction, i.e., lateral and vertical directions, thus making compact a device or system incorporated with such ball roller rolling members.

In addition, since such crossing arrangement can be made precisely, the device or system incorporated with such ball roller rolling members can be easily handled.

Moreover, the ball roller rolling member of the present invention is formed, on one of the end spherical portions on the side of the central rolling curved portion, with the spherical recessed portion, so that the ball roller rolling members can be stably aligned while rolling in various directions during a time of being conveyed by a parts-feeder, for example, in a state of the spherical recessed portions being directed downward.

In addition, by forming the spherical recessed portion, in comparison with a flat surface portion, the entire peripheral edge portion of this spherical recessed portion can be settled stably on a conveyance surface and stably conveyed. Furthermore, the working performance is not so severely required in comparison with the flat surface structure, thus being advantageous in working.

In the case of lapping the rolling curved portion, the lateral sides thereof can easily be recognized, the uniform grinding can be executed to the lateral end portions of the ball roller rolling member.

Still furthermore, in the case where a number of works such as material balls are magnetically adsorbed in a row and then ground simultaneously by a centerless grinder, for example, the spherical recessed portion of one work and the portion of the adjacent work positioned in opposition to the spherical recessed portion can take surface contact arrangement, so that the contacting portions are not displaced at the time of grinding, thus precisely grinding the rolling curved portion of the ball roller rolling member.

The nature and further characteristic features of the present invention will be made more clear from the following descriptions made with reference to the accompanying drawings.

BRIEF DESCRIPTION OF THE DRAWINGS

In the accompanying drawings:

FIG. 1 shows a ball roller rolling member according to one embodiment of the present invention, in which FIG. 1A is an illustrated front view of the ball roller rolling member, FIG. 1B is a side view thereof and FIGS. 1C and 1D are sectional views showing a cross arrangement thereof;

FIG. 4 shows a work working steps, in which FIG. 4A shows an enlarged sectional view of an essential portion in a pressing step, FIG. 4B shows a state of the work after the pressing step, and FIG. 4C shows a shape f after a work grinding step;

FIG. 5 shows a step after the working step of FIG. 4, in which FIG. 5A shows a state that the works pressed in the step of FIG. 4B are coupled in series in shape of rod and FIG. 5B shows a state after grinding the works in the state of FIG. 4A;

FIG. 6 shows another example of the ball roller rolling member having opposed recessed portions to which a center hole is provided, in which FIG. 6A is an illustrated front view thereof, FIG. 6B is a left side view thereof and FIG. 6C is a right side view thereof.

FIG. 7 shows a rotary bearing, in which FIG. 7A is a plan view, partially in section, of a rotary bearing in which the ball roller rolling members of FIG. 1 are incorporated, FIG. 7B is a partial sectional view of FIG. 7A, FIG. 7C is a partial sectional view showing a state of the ball roller rolling member arranged perpendicular to the ball roller rolling member arranged in form of FIG. 7B, and FIG. 7D shows one example of an incorporating hole structure;

FIG. 8 shows a linear motion guide in which the ball roller rolling member of FIG. 1 is incorporated, in which FIG. 8A is a sectional front view and FIG. 8B is a sectional view showing a circulation passage of the ball roller rolling member row of FIG. 8A;

FIG. 10 shows a linear motion guide in which the ball roller rolling members of FIG. 1 are incorporated in four rows, in which FIG. 10A is a sectional front view and FIG. 10B is a sectional view showing a circulation passage of the ball roller rolling member row of FIG. 10A.

DETAILED DESCRIPTION OF THE INVENTION

Preferred embodiments of the present invention will be described hereunder with reference to the accompanying drawings.

Figure 1:
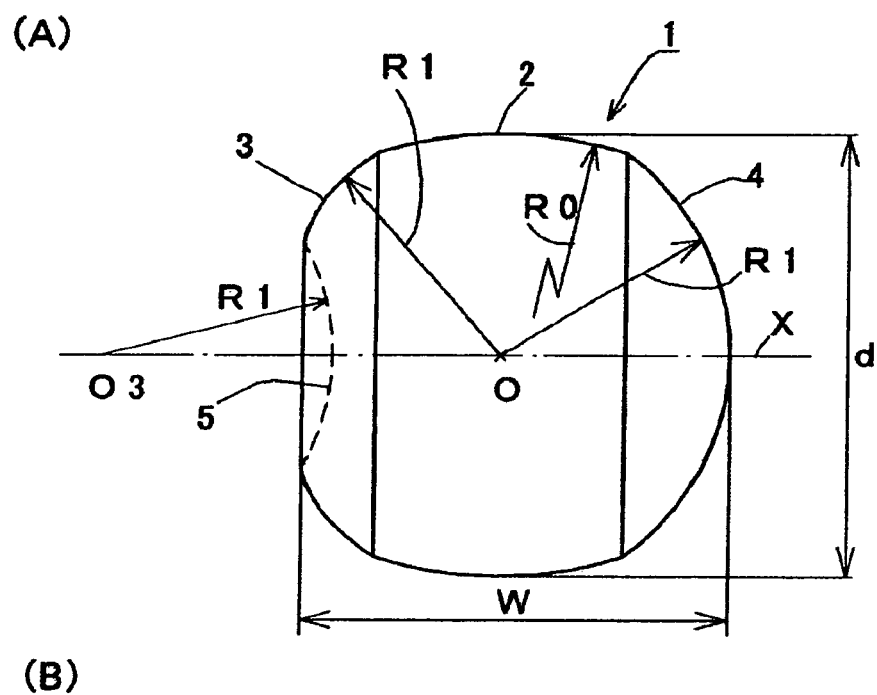
Figure 1:
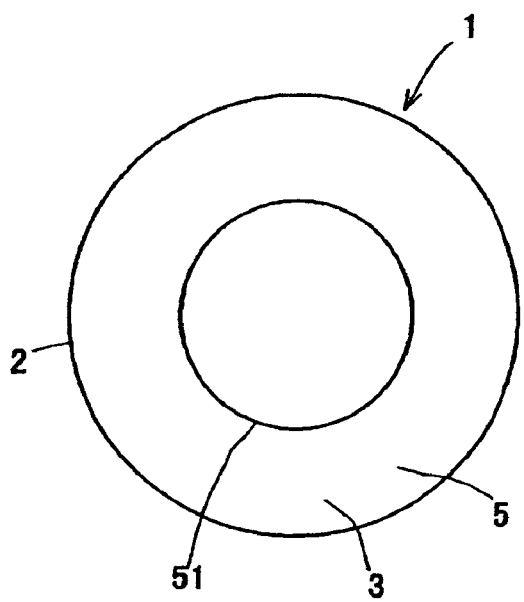
Figure 1:
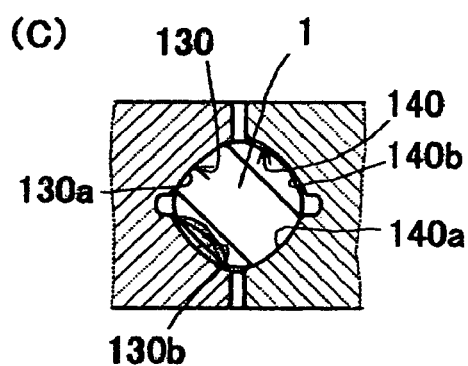
Figure 1:
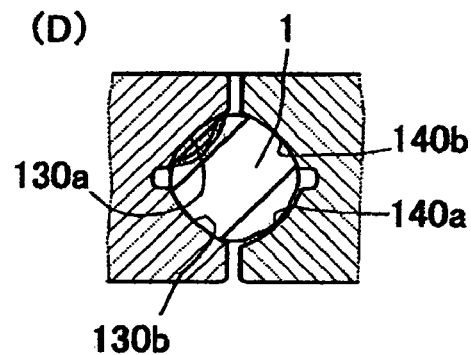

FIG. 1 is the ball roller rolling member according to one preferred embodiment of the present invention.

With reference to FIG. 1, the ball roller rolling member 1 is provided with a rolling curved portion 2 and a lateral end spherical portions 3, 4 spherically protruded at both end portions of the rolling curved portion 2. The rolling curved portion has an outer peripheral circular-arc portion having a radius RO larger than the radius of curvature R1 (R2) of each of the end spherical portions 3 and 4.

The rolling curved portion 2 has a portion of maximum diameter d and a distance W between both the end spherical portions 3 and 4 is shorter than the diameter d. As shown in FIGS. 1C and 1D, the ball roller rolling members 1 can take an arrangement, when incorporated in a rotating bearing, for example, in which rotational (rotating) axes of the adjacent ball roller rolling members are alternately perpendicular in a pair of track grooves 130 and 140 provided with track surfaces 130a, 130b and 140a, 140b of the rotating bearing, for example.

The radii of curvature R1 and R2 of the end spherical portions 3 and 4 have substantially the same diameter, the center of radius of curvature O is positioned on the central axis of the rolling curved portion 2, and the respective end spherical portions 3 and 4 are positioned on substantially one virtual spherical portion (surface). Further, an arrangement in which the centers of radii of curvature of both the end spherical portions 3 and 4 are displaced may be adopted, and in addition, an arrangement, in which the radii of curvature thereof are different from each other, may be also adopted. It is preferred that the displacement or shifting of the radius of curvature is in a direction that the end spherical portions 3 and 4 approach the axial direction, but in a certain case, it may be possible to be displaced in a direction separating from each other.

The end spherical portion 3 on one side is formed with a spherical recess or recessed portion 5 having the same radius of curvature R1 as that of the other end spherical portion 4. The spherical recessed portion 5 is formed by partially recessing a top portion of the end spherical portion 3, and the curvature radius center O3 of the spherical recessed portion 5 is positioned on the center axis X. This spherical recessed portion 5 has an outer edge portion 51 having a circular shape which is formed in accordance with a size of the ball roller rolling member 1.

The axial length W between the end spherical portions 3 and 4 is a length between a surface passing the outer edge portion 51 of the spherical recess 5 of one side end spherical portion 3 and the top portion of the other end spherical portion 4 (i.e., crossing point to the center axis X).

The ball roller rolling member 1 is manufactured from a work 10 made of a metal ball not hardened, for example. Further, as a work 10, a raw material ball, before hardening, for a ball bearing may be preferably utilized, and the manufacturing process comprises a plastic deformation step for deforming the work 10 so as to form the spherical recessed portion 5 and a grinding step for grinding the rolling curved portion 2.

Figure 3:
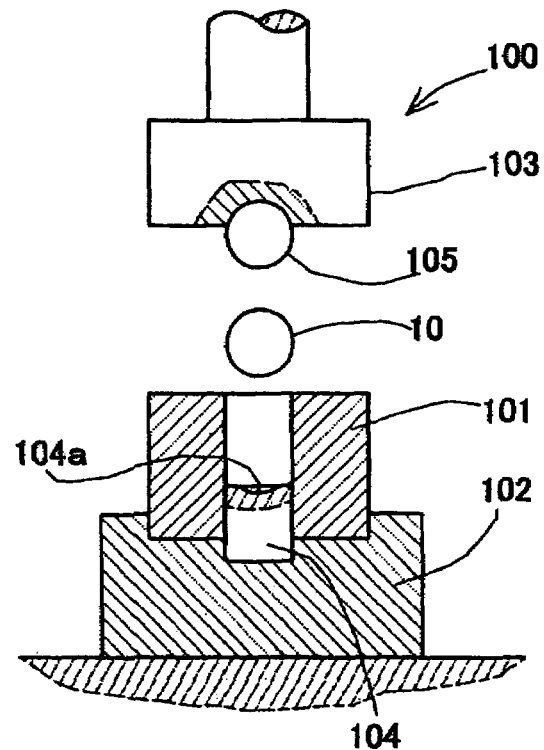
FIGS. 3A and 3B are schematic sectional views explaining a step for forming a spherical recessed portion of the ball roller rolling member shown in FIG. 1.
Figure 3:
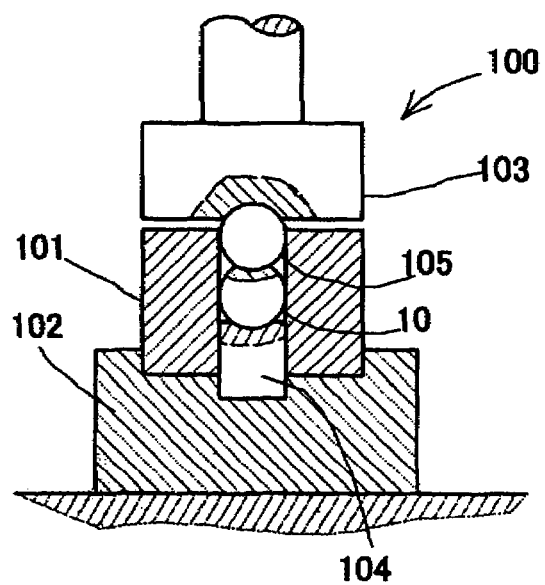

The plastic deformation step is carried out by using a plastic forming jig 100 shown in FIG. 3, for example.

The plastic forming jig 100 is provided with a cylindrical ring jig 101 pressing the outer periphery of the work 10, and an upper die 103 and a lower die 102, which are arranged vertically with the ring jig 101 being interposed therebetween.

The ring jig 101 has a cylindrical structure firmly assembled with the lower die 102. A punch 104 is inserted into the ring jig 101 and the punch 104 is formed with a recess 104a, having a predetermined depth, to which a portion of the work 10 is settled. The recess 104a has a spherical shape having the same radius of curvature as that of the work 10. A spherical pressing tool or member 105 formed from a hardened steel ball having the same shape as that of the work 10 is mounted to the upper die 103, and the work 10 inserted into the ring jig 10 is compressed by this pressing tool 105 to thereby form the spherical recess 5 to the work 10.

Figure 4:
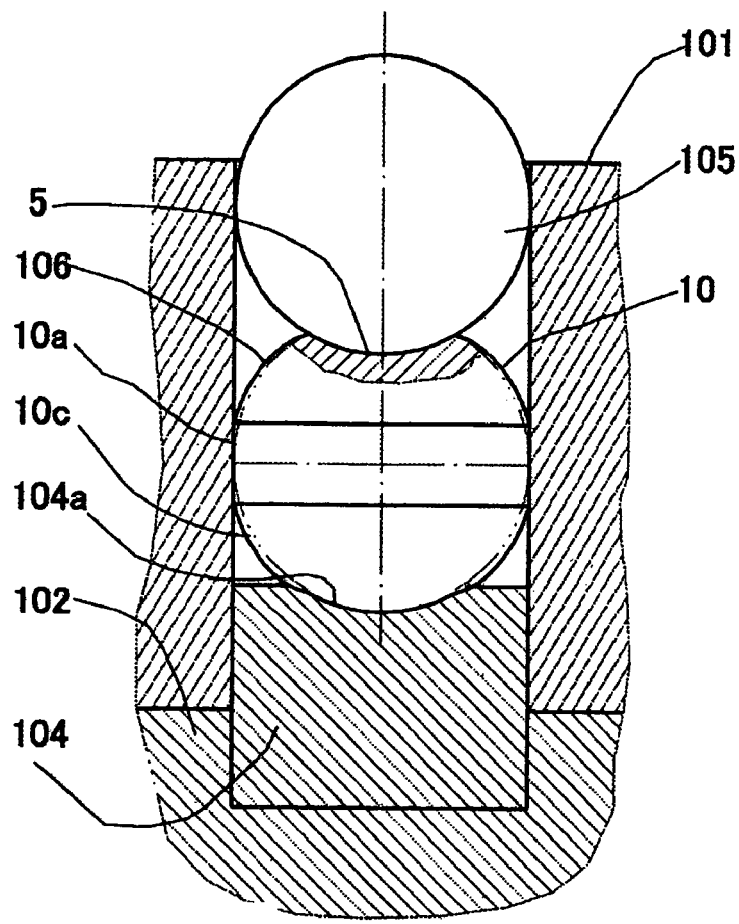
Figure 4:
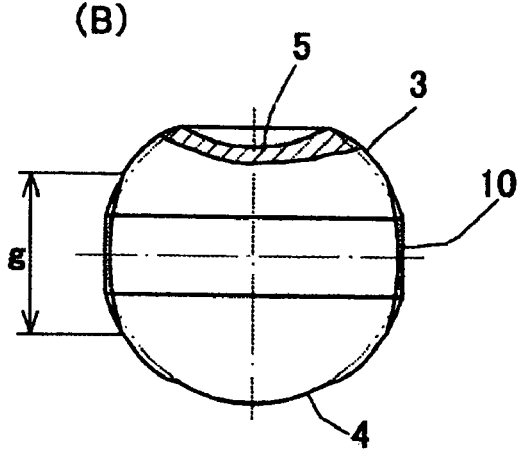
Figure 4:
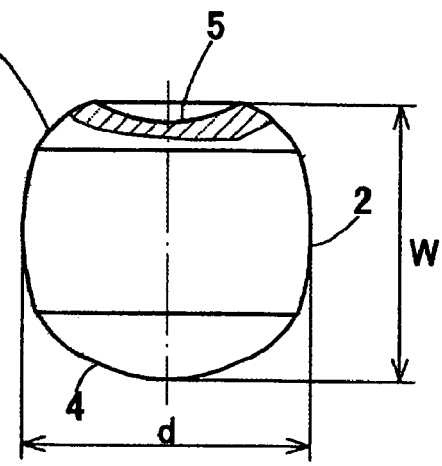

FIG. 4A is a view explaining the plastic deformation step.

As can be seen from FIG. 4A, the abutting portion of the steel ball hardened by the pressing pressure provides the spherical recessed portion 5, and entirely, is compressed in the axial direction of the jig 101, and the portion is swelled in the radial direction by an amount corresponding to this compression. The peripheral portion around the central portion of the work 10 is pressed against the inner peripheral portion of the ring jig 101 and then plastically deformed linearly. Since portions 106, 10c on both sides of the deformed linear central portion 10a are also swelled in circular shape over the original contour surface of the work 10, so that the swelled portions approach the final shape of the rolling spherical surface more than the original spherical shape, thus reducing an amount to be ground.

Then, a predetermined range g including the central cylindrical portion 10a of the thus plastically deformed work 10 is further ground as shown in FIG. 4B with two-dot-chain line, and as shown in FIG. 4C, further ground so as to provide the rolling curved surface 2 having a circular section having a radius of curvature larger than the end spherical portion 3 (4).

Figure 5:
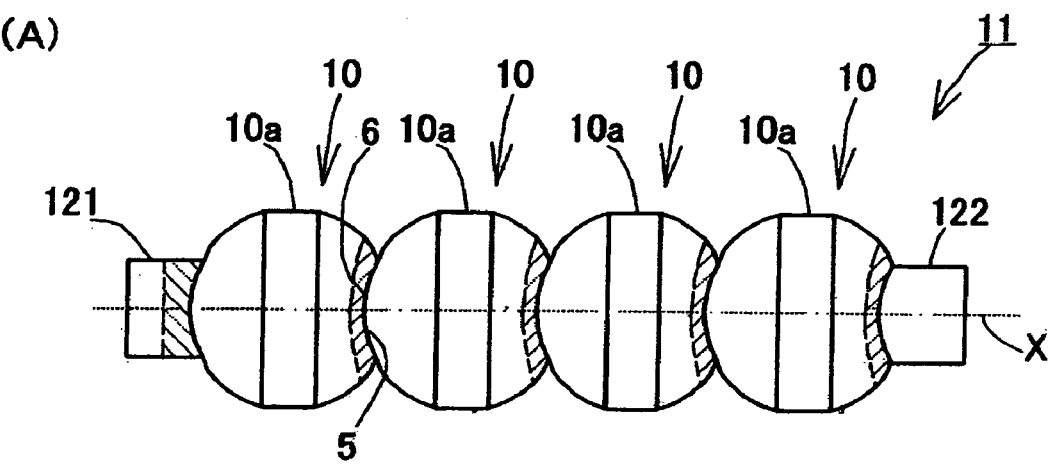
Figure 5:
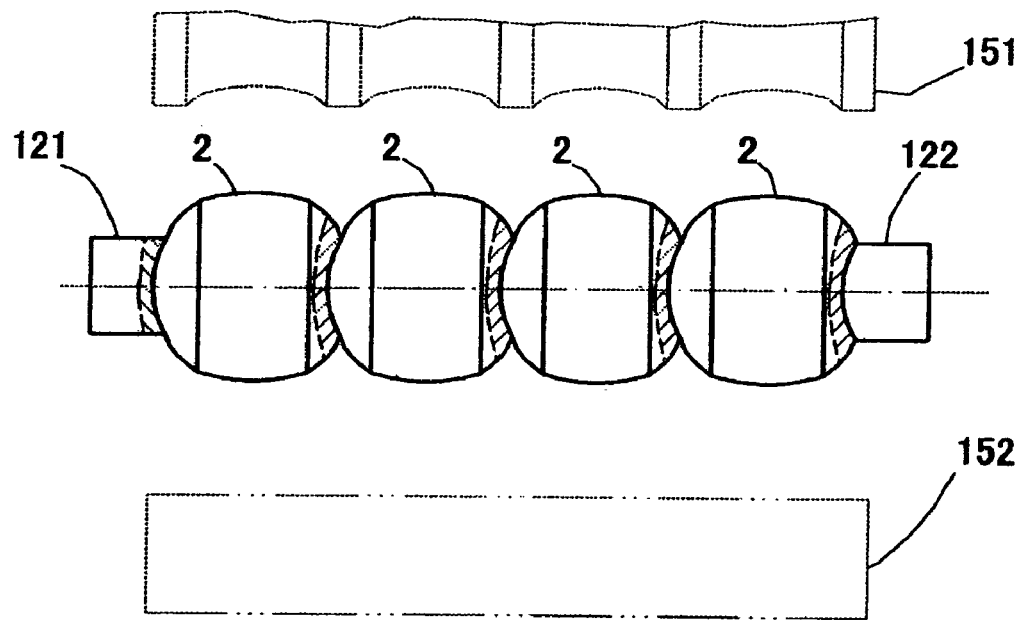

This grinding condition is shown in FIG. 5, and with reference to FIG. 5A, a plurality of works 10 are joined so as not to be moved from each other to form a work row 11 in form of rod having a virtual axis of X penetrating the centers of the respective works 10. The work row 111 is fed between a grinding wheel 151 and a regulating wheel 152 of a centerless grinder. As shown in FIG. 5B, thereafter, the outer peripheral portions of the respective intermediate works 10 in the work row 11 are simultaneously ground so as to work the rolling curved portion 2 having predetermined dimension and shape. In the work row 11, into the spherical recessed portion 5 of one work 10, a portion 6 of the adjacent work 10 is fitted. This portion 6 is formed on the side opposite, with respect to the center of the spherical portion of the ball roller, to the spherical recessed portion 5 of the latter mentioned work 10 (i.e., adjacent work).

Both the end portions of such rod-shaped work row 11 are snapped by N-pole jig and S-pole jig 121 and 122 so as to magnetically attract the respective works 10 to thereby provide the firmly fitted rod-shaped work row 11.

According to the above arrangement, since the contacting portions of the works provide a surface-contact state, the rolling curved portions 2 can be exactly and precisely ground without being slid at the contacting portions.

Figure 6:
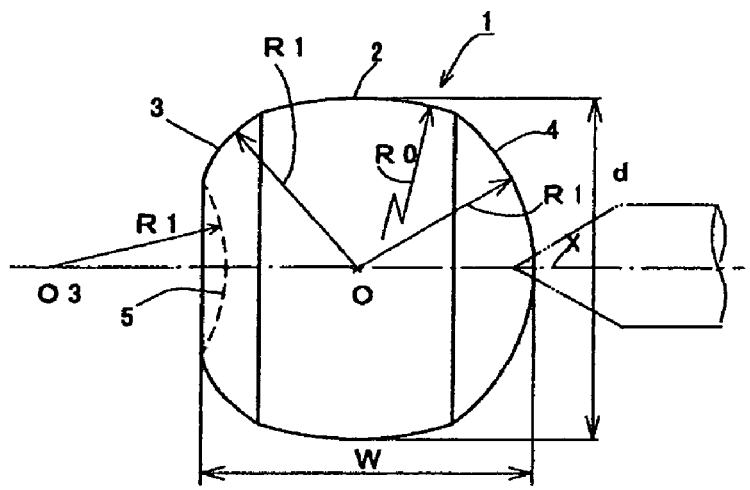
Figure 6:
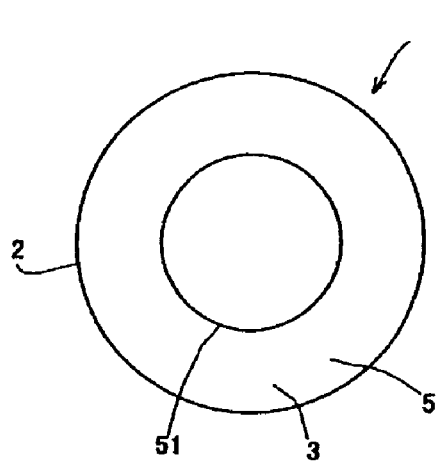
Figure 6:
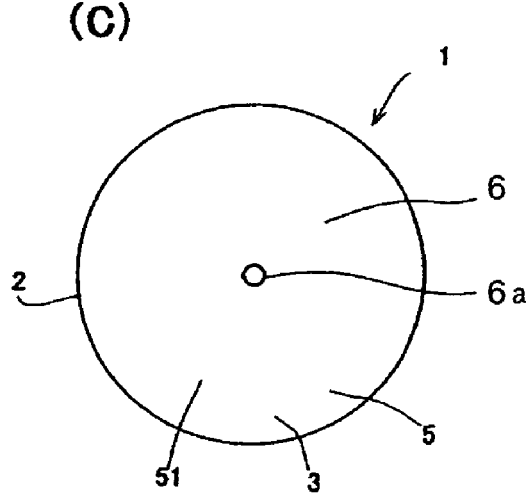

In an alternation shown in FIG. 6 (FIGS. 6A to 6C), for example, the portion 6 opposite to the spherical recessed portion 5 may be formed with a center hole 6a on a central axis X passing the center O of the ball and the center O3 of the radius of curvature of the spherical recessed portion. The formation of such center hole 6a facilitates the aligning or centering of the work 10 at the grinding process.

Figure 2:
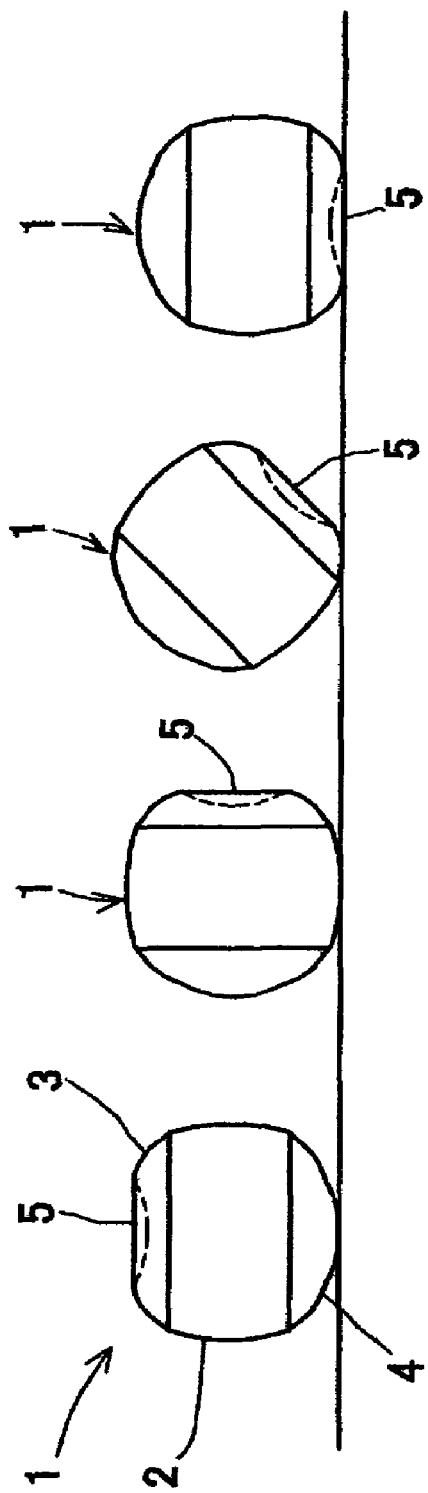
FIG. 2 is an illustration showing an alignment of the ball roller rolling member of FIG. 1.

Further, in a case where the ball roller rolling member 1 is conveyed by a parts-feeder, they are conveyed while rolling in various directions, as shown in FIG. 2, but finally, the ball roller rolling members 1 are aligned and stably arranged in a state that the spherical recessed portions 5 of the end spherical portions 3 are directed downward.

Furthermore, in the case of lapping the rolling curved portion 4, since the lateral position or direction thereof can be ensured by the presence of the spherical recessed portion 5, it becomes possible to change the lateral direction of the ball roller rolling member 1, which is charged from the central portion, then passes through the spiral groove, is ground and discharged from the outer peripheral portion so as to again supply (lapping feed) the ball roller rolling member from the central portion to grind it laterally uniformly.

In addition, in the case of measuring the dimension of the ball roller rolling member 1, the width and height thereof can be exactly measured with reference to the spherical recessed portion 5 being the base in a standing state with the spherical recessed portion 5 being directed downward, whereby the ball roller rolling members having uniform dimension can be obtained.

In the case where the incorporating of the ball roller rolling members into a bearing, liner motion guide and the like is automated, it is a matter of important to align the ball roller rolling members 1. This important matter can be effectively achieved by the ball roller rolling members according to the present invention.

Still furthermore, it is a matter of important to prepare the ball roller rolling members having uniform dimension. According to the present invention, this important matter can be also achieved by making precise the dimension thereof.

Figure 7:
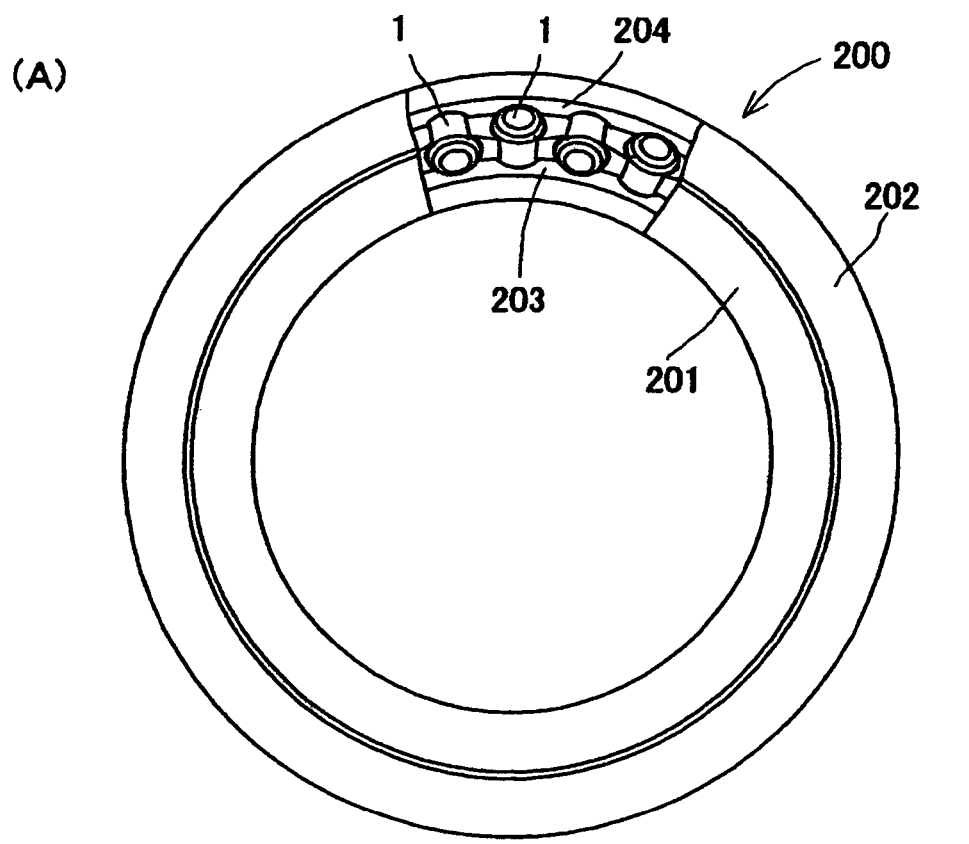
Figure 7:
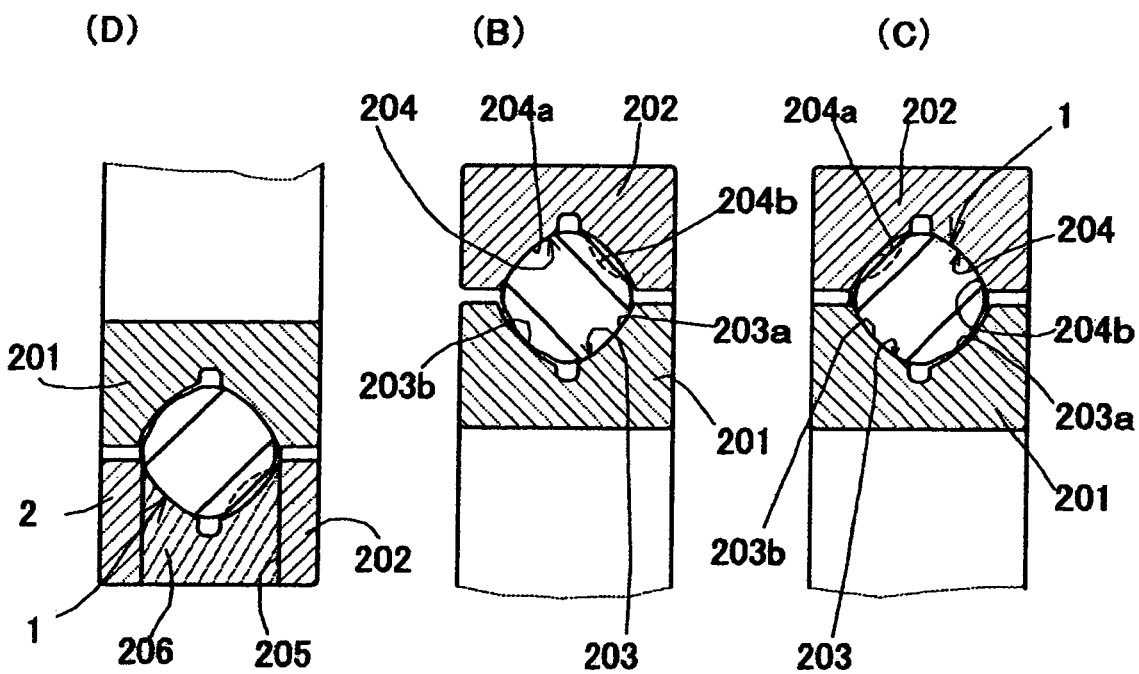

FIG. 7 represents a rotating bearing 200 incorporated with the ball roller rolling members 1 of the present invention.

That is, with reference to FIG. 7 (FIGS. 7A to 7D), the rotating bearing 200 includes an inner ring 201 and an outer ring 202. The inner ring 201 has an outer peripheral portion and the outer ring 202 has an inner peripheral portion, and the opposing outer and inner peripheral portions of these rings 201 and 202 form a pair of track grooves 203 and 204, respectively, between which the ball roller rolling members 1 are accommodated. The track grooves 203 and 204 are formed with track surfaces 203a, 203b and 204a, 204b perpendicular to each other as shown in FIG. 7B or 7C, for example, so as to provide a crossing arrangement in which the rotational axes of the adjacent ball roller rolling members 1 are alternately perpendicular to each other.

According to such crossing arrangement, in an angular contact type roller bearing, in term of moment load, a single row of rolling members is required, whereas two rows of rolling members have been required in the conventional angular type roller bearing, thus making compact the entire structure in size.

Furthermore, according to an embodiment in which the ball roller rolling members 1 are incorporated or accommodated in the track grooves through incorporating hole 205 formed to the outer ring 202, the incorporation may be automated by the aligning ability as the characteristic feature of the ball roller rolling member 1, and such hole 205 will be closed, after the incorporation, by means of plug 206, for example, as shown in FIG. 7D.

Figure 8:
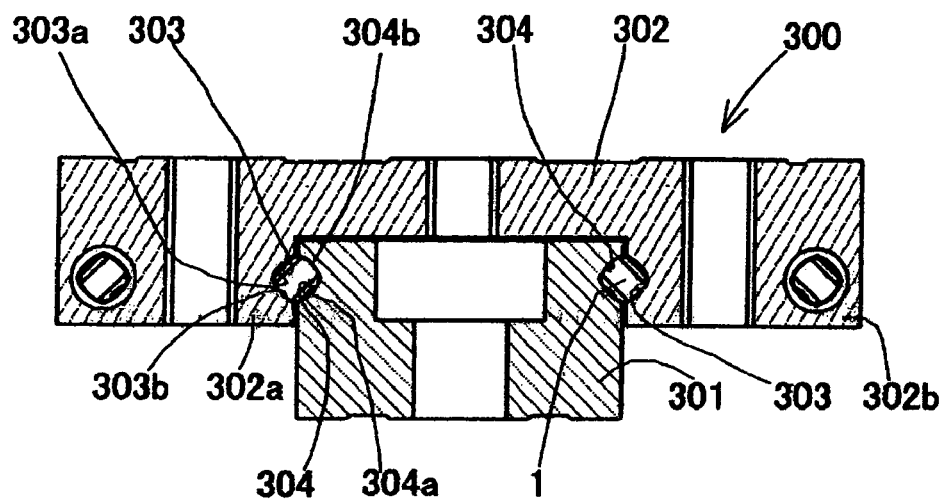
Figure 8:
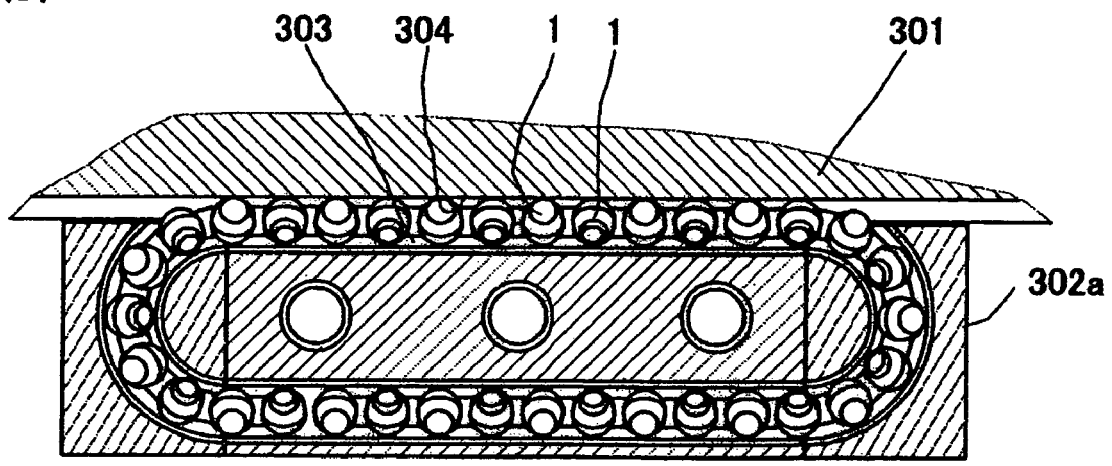

FIG. 8 (FIGS. 8A and 8B) represents a linear motion guide 300 incorporated with the ball roller rolling members 1 of the characters mentioned above.

The linear motion guide 300 comprises a track rail 301, a movable block 302 and a number of ball roller rolling members 1 disposed between the track rail 301 and the movable member 302 in the arrangement mentioned below.

That is, the side surfaces of the track rail 301 are formed with grooves 303, respectively, and the inner side surfaces of a lateral pair of leg portions (i.e., skirt portions) 302a and 302b of the movable block 302 are also formed with grooves 304. The grooves 303 and 304 constitute a pair of track rails 303, 304 between which a number of ball roller rolling members 1 are incorporated. The track grooves 303 and 304 are provided with track surfaces 303a, 303b and 304a, 304b so as to be perpendicular to each other so that the rotational axes of the ball roller rolling members 1 are alternately perpendicular to each other.

According to such crossing arrangement, loads in four directions (i.e., lateral two and vertical two directions) can be supported by two lateral rows (i.e., one right side row and one left side row), whereas four rows (i.e., vertically two right side rows and vertically two left side rows) have been required in the conventional linear motion guide, thus making compact the entire structure in size.

It is further to be noted that the present invention is not limited to the described embodiments and many other changes and modifications may be made without departing from the scopes of the appended claims.

For example, in the described embodiments, it is characterised that the rotational axes of the adjacent ball roller rolling members 1 of the present invention are incorporated or accommodated in the crossing arrangement, but the present invention is not limited to the crossing arrangement and the ball roller rolling members 1 of the present invention may be applicable to a rotating bearing and a linear motion guide in which the rotational axes of the ball roller rolling members are parallel to each other.

Figure 9:
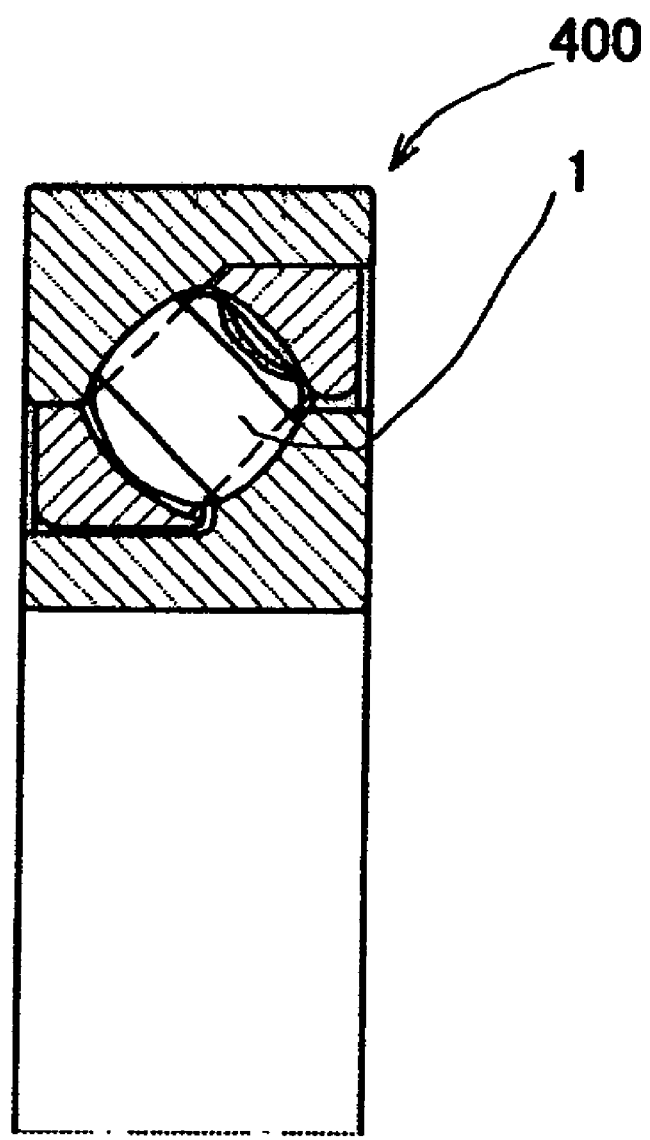
FIG. 9 is a sectional view of an essential portion of an angular contact type bearing in which the ball roller rolling member of FIG. 1 is accommodated.
Figure 10:
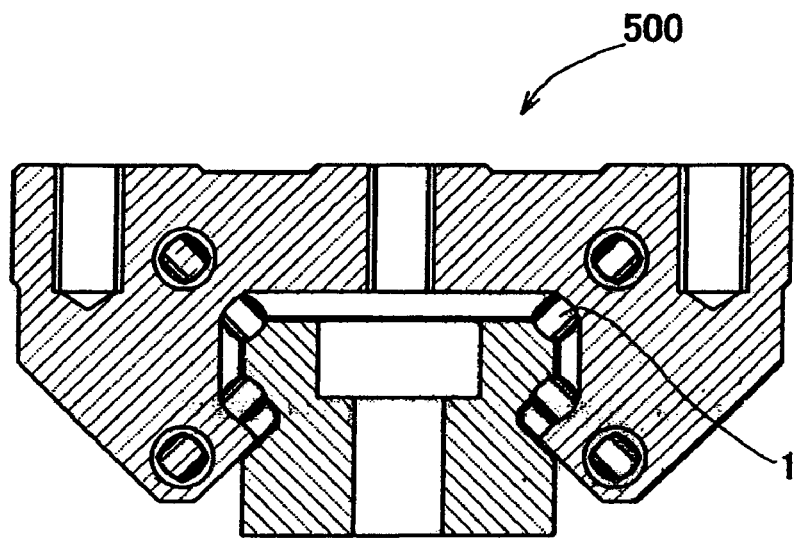
Figure 10:
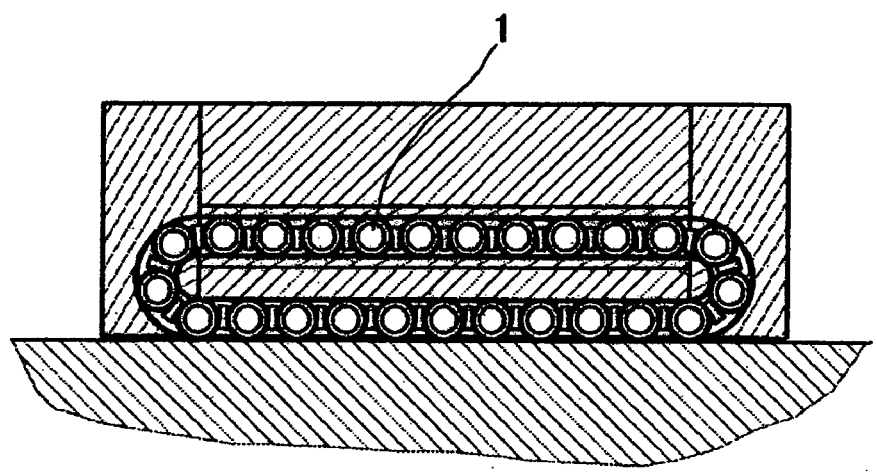

Further, FIG. 9 represents an example in which the ball roller rolling members 1 of the present invention are applied to an angular-contact type bearing 400, and FIG. 10 represents an example in which the ball roller rolling members 1 of the present invention are applied to a linear motion guide 500 provided with four rows of the ball roller rolling members.

The invention claimed is:

1. A bearing comprising ball roller rolling members comprising:
a rolling curved portion having a circular-arc outer periphery; and
end spherical portions provided on both sides of the rolling curved portion so as to be spherically swelled outward, respectively, said rolling curved portion having a radius of the circular-arc portion larger than a radius of curvature of each of the end spherical portions,
wherein a maximum diameter of the rolling curved portion is greater than a distance between the end spherical portions, the ball roller rolling members are arranged between a pair of track grooves having track surfaces perpendicular to each other so that rotational axes of the adjacent ball roller rolling members are alternately perpendicular to each other, and one of the end spherical portions is formed with a spherical recessed portion having a radius of curvature equal to that of the one of the end spherical portions.

* * * * *